(12) United States Patent
Graichen et al.

(10) Patent No.: US 10,753,609 B2
(45) Date of Patent: Aug. 25, 2020

(54) POROUS ROTATING MACHINE COMPONENT, COMBUSTOR AND MANUFACTURING METHOD

(71) Applicant: Siemens Aktiengesellschaft, Munich (DE)

(72) Inventors: Andreas Graichen, Norrköping (SE); Jenny Larfeldt, Finspang (SE); Daniel Lörstad, Finspang (SE); Erik Munktell, Finspang (SE)

(73) Assignee: Siemens Aktiengesellschaft, Munich (DE)

( * ) Notice: Subject to any disclaimer, the term of this patent is extended or adjusted under 35 U.S.C. 154(b) by 480 days.

(21) Appl. No.: 15/510,336

(22) PCT Filed: Sep. 18, 2015

(86) PCT No.: PCT/EP2015/071412
§ 371 (c)(1),
(2) Date: Mar. 10, 2017

(87) PCT Pub. No.: WO2016/050530
PCT Pub. Date: Apr. 7, 2016

(65) Prior Publication Data
US 2017/0299181 A1 Oct. 19, 2017

(30) Foreign Application Priority Data
Sep. 30, 2014 (EP) ..................................... 14187064

(51) Int. Cl.
*B22F 3/11* (2006.01)
*B22F 7/00* (2006.01)
(Continued)

(52) U.S. Cl.
CPC ............ *F23R 3/002* (2013.01); *B22F 3/1055* (2013.01); *B22F 3/11* (2013.01); *B22F 3/1121* (2013.01);
(Continued)

(58) Field of Classification Search
CPC . F01N 1/02; F01N 1/023; F01N 1/026; F01N 1/04; F01N 2210/02;
(Continued)

(56) References Cited

U.S. PATENT DOCUMENTS

2009/0047439 A1* 2/2009 Withers ............... B22D 23/003
427/448
2013/0018483 A1* 1/2013 Li ........................... B22F 3/105
623/23.55
(Continued)

FOREIGN PATENT DOCUMENTS

EP 1452264 A1 9/2004

OTHER PUBLICATIONS

EP Search Report dated Mar. 27, 2015, for EP patent application No. 14187064.2.
(Continued)

*Primary Examiner* — Vanessa T. Luk
(74) *Attorney, Agent, or Firm* — Beusse Wolter Sanks & Maire

(57) ABSTRACT

A rotating machine component, particularly a gas turbine combustion component, having at least one part built from a porous material with a plurality of pores, wherein at least a subset of the plurality of pores is at least partly filled with a gas with a composition different from air and/or with a powder, wherein the porous material is a laser sintered or laser melted material in which void local regions form the
(Continued)

plurality of pores. The component counter-acts vibrations. A rotating machine or gas turbine engine may have such a component.

16 Claims, 3 Drawing Sheets

(51) Int. Cl.
|  |  |
|---|---|
| *B22F 3/105* | (2006.01) |
| *F23R 3/00* | (2006.01) |
| *B33Y 10/00* | (2015.01) |
| *B33Y 50/02* | (2015.01) |
| *B33Y 80/00* | (2015.01) |
| *B23K 26/342* | (2014.01) |
| *B22F 5/00* | (2006.01) |
| *B23K 26/12* | (2014.01) |
| *B23K 101/00* | (2006.01) |

(52) U.S. Cl.
CPC .............. *B22F 5/009* (2013.01); *B22F 7/006* (2013.01); *B23K 26/127* (2013.01); *B23K 26/342* (2015.10); *B33Y 10/00* (2014.12); *B33Y 50/02* (2014.12); *B33Y 80/00* (2014.12); *F23R 3/007* (2013.01); *B22F 2003/1057* (2013.01); *B23K 2101/001* (2018.08); *F23R 2900/00014* (2013.01); *F23R 2900/00018* (2013.01); *F23R 2900/03042* (2013.01)

(58) Field of Classification Search
CPC ............ F01N 2210/04; F01N 2490/14; F01N 2490/15; F23R 3/02; F23R 3/002; F23R 2900/00014; F23R 2900/00018; F23R 2900/03041; F23R 2900/03042; F23R 2900/03043; F23R 2900/03044; F23R 2900/03045; B23K 26/34; B23K 26/342; B23K 2101/001; B23K 2101/04; B22F 3/008; B22F 3/105; B22F 3/1055; B22F 3/11; B22F 3/1103; B22F 3/1109; B22F 3/1118; B22F 3/1121; B22F 3/1125; B22F 3/1134; B22F 3/1137; B22F 3/114; B22F 3/1143; B22F 3/1146; B22F 2003/1051; B22F 2003/1052; B22F 2003/1053; B22F 2003/1054; B22F 2003/1056; B22F 2003/1057; B22F 2003/1058; B22F 2003/1059; B22F 2003/1106; B22F 2003/1128; B22F 2003/1131; B22F 5/009; B22F 5/04; B22F 5/10; B22F 7/002; B22F 7/004; B22F 7/006
See application file for complete search history.

(56) References Cited

U.S. PATENT DOCUMENTS

| | | | |
|---|---|---|---|
| 2013/0045091 A1* | 2/2013 | Della-Fera | F01D 11/122 415/174.4 |
| 2016/0214176 A1* | 7/2016 | Bruck | C23C 24/103 |
| 2016/0288210 A1* | 10/2016 | Birnkrant | B22F 3/1125 |

OTHER PUBLICATIONS

International Search Report dated Nov. 3, 2015, for PCT/EP2015/071412.

* cited by examiner

POROUS ROTATING MACHINE COMPONENT, COMBUSTOR AND MANUFACTURING METHOD

CROSS REFERENCE TO RELATED APPLICATIONS

This application is the US National Stage of International Application No. PCT/EP2015/071412 filed Sep. 18, 2015, and claims the benefit thereof. The International Application claims the benefit of European Application No. EP14187064 filed Sep. 18, 2015. All of the applications are incorporated by reference herein in their entirety.

FIELD OF THE INVENTION

The invention relates to a rotating machine component, particularly a gas turbine combustion component, comprising at least one part built from a porous material. The rotating machine component may particularly be a combustor, in particular a combustion liner. The invention furthermore relates to a method of manufacturing of such a component.

BACKGROUND OF THE INVENTION

Combustion devices, for example combustors of gas turbine engines, fulfill the task to provide a hot working fluid to mechanically drive further downstream components, e.g. to act upon turbine blades of the gas turbine engine to rotate a shaft and a disc to which the turbine blades are attached. During operation of such combustion devices the combustion device may be affected by combustion dynamics, for example by vibration of components of a combustion device like a combustion liner. These combustion dynamics may result in physical vibrations of the component and/or noise resulting from the vibrating combustion device. To counteract such combustion vibration secondary measures typically are applied like so called soft walls or Helmholtz dampers or resonators in the combustor. These secondary measures damp vibrations at specific frequencies. In particular it is a goal to avoid coupling between device Eigen frequencies (which relates to natural frequencies of the device) with main combustion dynamics frequencies. This undesired coupling has to be considered in the development process leading to a longer development time. Furthermore such a combustion device with Helmholtz dampers will be more complex and more difficult to manufacture.

Also known are production methods that have been established in recent years. Some of them are so called additive manufacturing methods including selective laser sintering and selective laser melting, direct laser deposition or electron beam welding. These methods allow solidification of a material which is typically based on providing a powder at specific locations by directing laser to these locations and melting the powder locally, which connects then to the existing material. Repeated deposition of layers builds up the complete structure. As a result a solid component can be manufactured with fine structures in it.

SUMMARY OF THE INVENTION

The present invention seeks to mitigate the mentioned problem of vibration of rotating machine components particularly within combustion devices.

This objective is achieved by the independent claims. The dependent claims add further specific details and describe advantageous developments and modifications of the invention.

According to the invention it is provided a rotating machine component or a turbomachine component, particularly a gas turbine combustion component, comprising at least one part built from a porous material comprising a plurality of pores, wherein at least a subset of the plurality of pores is at least partly filled with a gas with a composition different from air and/or with a powder.

A rotating machine component defines herein a component which is part of a rotating machine but does not need to rotate itself, i.e. a non-rotating component of a rotating machine.

The term "gas" herein is not a normal ambient air. Particularly one component of the gaseous composition shall be sufficiently different from ambient air. Particularly as the one component the gas may comprise argon.

The term "porous" defines a material that has voids. The voids may be closed cells from which no encapsulated material or gas can exit. Therefore the material could also be defined as "cellular" instead of "porous". Several cells may be completely separated from another (closed cells) or at least some cells may be fluidically connected to another (open cells). A region of porous material may particularly be sealed to the surrounding so that no gas or fluid can exit the cells.

The gas may be particularly an inert gas. More particularly, the gas may have no oxygen content.

The term "powder" is used herein to denote a loose material or loose particles. A powder may comprise a plurality of small solid particles. These particles may not be joined in the state of a powder though or may not be solidified due to attachment of particles to each other. These particles are therefore advantageously free to flow and not coalesce.

To use the pores and the filling of these by gas and/or powder for components that typically would experience vibrations, it is advantageous that this can result in a damping effect to counteract the vibrations when they occur. The pores, i.e. the cavity built by the pores, may affect system Eigen frequencies of the component. The gas and/or the powder may support the damping effect. This is particularly advantageous as the component itself does not need to be provided with Helmholtz dampers or other soft wall features. The dampening effect may be utilized just by modifying the structure of the component.

In an embodiment, the porous material may be a laser sintered or laser melted material in which void or blank local regions form the plurality of pores. Walls surrounding the pores define the shape of the pores and also the form of the void local regions. Some pores may be connected to each other, some pores may be distinct. The pores may be filled by a gas that is anyhow present in the process of laser sintering or laser melting. The powder may also be a powder that is anyhow present in the laser sintering or laser melting process, like unsolidified particles that otherwise would be used for build-up of the component in the laser sintering or laser melting process.

The gas may be particularly an inert gas. It may particularly comprise argon. Alternatively the gas may be just argon, i.e. 100% argon.

By using laser sintering or laser melting it is possible to design completely enclosed pores that have no exit or inlet which otherwise would allow a gas or the powder to exit or enter the pores. Some pores may be connected to others though so that they build a more complex structure but still completely encapsulating and/or sealing a volume within the material.

In another embodiment pores may be built by material of metal foam, particularly a closed cell metal foam. Metal foam builds up a porous material on its own. To guarantee that no powder or gas will leave the metal foam structure it may be advantageous to coat the metal foam component. Alternatively the metal foam can be built in a mould-type container through which the gas or the powder cannot pass.

To guarantee a good damping effect it may be advantageous to have non-uniform pore shape meaning having pores with different sizes and/or different shapes and/or a distribution over the part which is non-uniform.

The degree to which the pores are filled with gas and/or powder may be different over a number of pores. This may allow damping over a wider range of frequencies.

The sizes and/or the shapes of the plurality of pores and/or the distribution of the plurality of pores over the at least one part may be selected to modify the Eigen frequencies of the rotating machine component. With "modify the Eigen frequencies" it is meant that the Eigen frequency differs for the inventive rotating machine component in comparison to a machine that would have a part of the same shape as the new part built according to the invention but without a material that provides pores and/or without filling of the material with gas and/or powder. It is clear that Eigen frequencies and resonances can only be defined and will only occur or will only be established during operation of the machine.

With Eigen frequency a frequency is meant in which a system is in resonance and a material would experience strong vibrations. The Eigen frequency is a natural resonant frequency of a system.

As already mentioned, the pores may be closed cavities without passages to an exterior of the part, i.e. open cells or closed cells with a sealed exterior surface of the part. In other words, the component has a further non-porous material surrounding the part. The part therefore has a surface or layer sealing the porous part to disallow leaking. That means particularly if gas is used within the pores that the pores may be gas-tight. In case powder is used within the pores a gas-tight enclosure may not be required but at least no passages should be present that allow an exit of the powder through the passages. Therefore passage sizes may be less than the size of individual particles of the powder. It may be accepted though that some pores may be connected and built together a closed enclosure. That means the component may have an impermeable outer surface and either an open or closed cell structure bounded by the outer surface.

The component may be particularly a combustion liner or any other part within a combustor or combustion chamber that will be affected by vibrations during operation. As these are typically hot components during operation there may be cooling channels which go through the part or there may be cooling holes within the part or other cooling features. The cooling channels or the cooling holes will be present to guide cooling fluid which, in case of a gas turbine engine, will be usually taken from the compressor section of the gas turbine engine. Cooling fluid may be provided by any means as long as there is a pressure difference allowing a cooling fluid to enter and pass through the cooling channel.

The invention is also related to a combustor, particularly a gas turbine combustor, as already indicated in the previous sections. Particularly the part may be a sheet-like piece, particularly a combustion chamber liner, wherein that part is arranged as described herein.

The invention is furthermore directed to a manufacturing method of such a part of a turbomachinery (rotating machine) component. Again, the part may particularly be stationary. This manufacturing method particularly comprises the steps of building-up of the part as a porous structure by solidifying a base material. The base material may be particularly metal foam which inherently will generate a plurality of pores. Alternatively the base material may be generated via laser sintering or laser melting, wherein the laser sintering or laser melting is set-up to leave blank local regions to form a plurality of pores. Included in the step of building-up the part a further step is executed such that a gas or a powder as explained before will be provided such that during the build-up the gas or the powder will be included and encapsulated into the pores. As a result, some of the pores or all of the pores will at least partly be filled with that gas and/or that powder.

For the manufacturing method, instructions may be generated to position the laser. The instructions can define the path of the laser and/or when to switch on or off the laser. The positioning can be done by repositioning the laser spot or by moving the part itself.

The structure of the part that has the pores may be defined in a computer-aided design (CAD) model. Alternatively a control system of the additive manufacturing machine may be changed compared to existing control systems such that random pores may be generated and added within at least some of the solid structures defined by the computer-aided design model just by the control system. Input to the control system may be a specification of the minimum pore size and/or the maximum pore size. Other input parameters may be possible which allow to define boundaries between which random shapes and sizes and random distribution of pores are allowed.

With this new manufacturing method parts can be produced as defined by the invention by enclosing chamber gas (gas that is present in the chamber for manufacturing) which is used—used anyhow—in the production step of laser sintering or laser melting. Alternatively, the powder which is present in the machine to be solidified selectively can be used as filling powder to the pores, if the powder does not get solidified. Thus, the powder is not just used to be solidified and to build the structure but also to fill the cells with loose powder. The powder which is not solidified may be encapsulated by solid structures produced by laser melting or laser sintering so that the same powder which is used for solidification in the laser sintering and laser melting process can also be used as a damping powder within the pores.

Alternatively during the laser sintering or laser melting process the powder could be replaced by a different type of powder, e.g. to blow away powder used for solidification of structures and to distribute a different type of powder before a pore will be sealed completely by the laser sintering or laser melting process.

The powder and the gas may fill the pores completely. There may also be means possible to evacuate a fraction of a volume of the pore before the pore is sealed completely.

As an example, after several layers of melted and then solidified particles have been deposited to the working surface and in parts have be solidified such that in the tool a partly solidified component is present with loose particles in the unsolidified regions, it may be possible to remove the loose particles for example by using a stream of air and to replace them by a different powder. Based on that step, then again a layer of to be solidified particles can be distributed on that surface in which depressions are filled with a replacement powder which shall remain in the pores eventually. This procedure is just an example and allows using a different powder within the pores as the powder of the to be solidified components. In such a case, two different sources of powders may be present in the manufacture tool. The control system of the tool may select which one of the powders shall be submitted on the surface at a specific process step.

For example the packing density in a pore may be up to 80% or up to 70% such that the particles may be able to move. A minimum percentage of powder may be a packing density of 30% or 40%.

To allow semi-filled or partly filled pores with only a fraction of powder filled in the pore it may be possible to use the previously explained process to provide different types of powders and to use a powder that at least in parts would convert to a gaseous state when it will be affected by heat during operation of the gas turbine combustor.

To provide only partly filled pores with powder in the production method it may also be possible to leave some exits in some of the pores and after a fraction of the powder has been evacuated from the pore the structure may be coated or sealed so that only a less amount of the powder remains within the pores. This would allow movement of the powder within the pores during operation of the machine to improve the damping effect.

The invention is particularly advantageous as previously solid parts are now produced having a sponge-like or foam material. The porosity of that material may be particularly variable over the expanse of the produced part. Alternatively the porosity could be even or homogeneous over the whole part. The cavities provided by the porosity may affect these system Eigen frequencies while the powder helps for damping. This results in a built-in system for damping such that the part does not need to be designed specifically for some Eigen frequency problems. Helmholtz dampers or other features do not need to be included into the component, but optionally may be included though. This will also improve—that means reduce—a project lead time and will simplify the production method compared to components that require a number of dampening features and subsequent tuning steps.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matter, in particular between features of the apparatus type claims and features of the method type claims is considered as to be disclosed within this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying schematic drawings, of which.

DETAILED DESCRIPTION OF INVENTION

Figure 1:
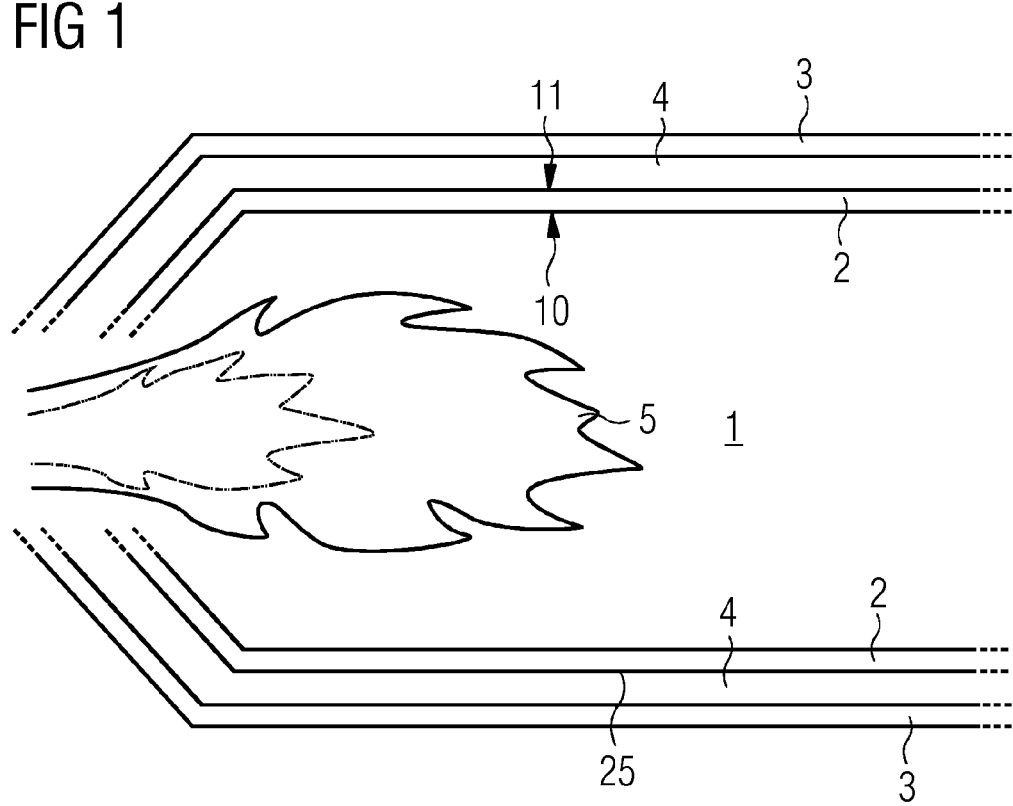
FIG. 1 shows a longitudinal section of typical combustor.

The illustrations in the drawings are schematic. It is noted that for similar or identical elements in different figures, the same reference signs will be used to denote the same or equivalent features.

Some of the features and especially the advantages will be explained for an assembled or operating gas turbine but obviously the features can also be applied to the single components of the gas turbine but may show the advantages only once assembled and during operation. By the way explained by means of a gas turbine during operation none of the details should be limited to a gas turbine while in operation.

As the invention is related to vibration, the features can also be applied to different types of machines that are affected by vibrations irrespective of the source or cause or to different components within a gas turbine engine that experience vibrations.

Combustion devices are employed in a number of different environments, including gas turbines, furnaces and boilers.

In the following it will be focused on a combustion device but the invention can also be applied to other components affected by vibrations, like a casing of an engine.

A gas-turbine engine may serve as one example of a rotating machine. The gas turbine—short for gas-turbine engine—comprises an air inlet at one end followed by a compressor stage in which incoming air is compressed for application to one or more combustors as combustion devices, which may be annular or so-called can-annular, the latter being distributed circumferentially around the turbine's rotational axis. Fuel is introduced into the combustors and is there mixed with a major part of the compressed air taken from the compressor. Hot gases created by combustion in the combustors are directed to a set of turbine blades within a turbine section, being guided in the process by a set of guide vanes, and the turbine blades and the shaft—the turbine blades being fixed to a shaft—forming the rotor are turned about an axis as a result. The rotating rotor in turn rotates blades of the compressor stage, so that the compressed air is supplied by the gas turbine itself once this is in operation. There may be more than one rotor in the gas-turbine engine.

According to FIG. 1, a combustion chamber 1 is depicted in a cross-sectional and fairly abstract view. Particularly two combustion chamber walls, the inner wall 2 and the outer wall 3 are shown which are arranged coaxially. A combustion chamber may only have a single wall instead. In the given example, the inner wall 2 and the outer wall 3 form a combustion liner. Between the inner wall 2 and the outer wall 3 an annular cooling cavity 4 may be present. The inner and outer wall 2, 3 are surrounding a combustion zone including a main flame 5 during operation. During operation the main flame 5 will be present in the combustion zone but possibly may be instable in some modes of operation, e.g. in transient operation. In these instable modes of operation, the inner wall 2 and/or the outer wall 3 may start to vibrate. These kinds of vibrations may particularly occur in prior art combustion chambers in which the inner wall 2 and/or the outer wall 3 are manufactured from a solid sheet of metal.

According to the invention, the inner wall 2 and/or the outer wall 3 may represent the rotating machine component as claimed in the patent claims. In the following, the invention is only explained for the inner wall 2 but may be also present for the outer wall 3 or with other gas turbine components which may be affected by vibrations, like combustion and/or rotational and/or aerodynamic vibrations. The inner wall 2 therefore may be built from a porous material comprising a plurality of pores which perform a damping effect. The porous material will be explained further in relation to FIGS. 2A and 2B.

Figure 2A:
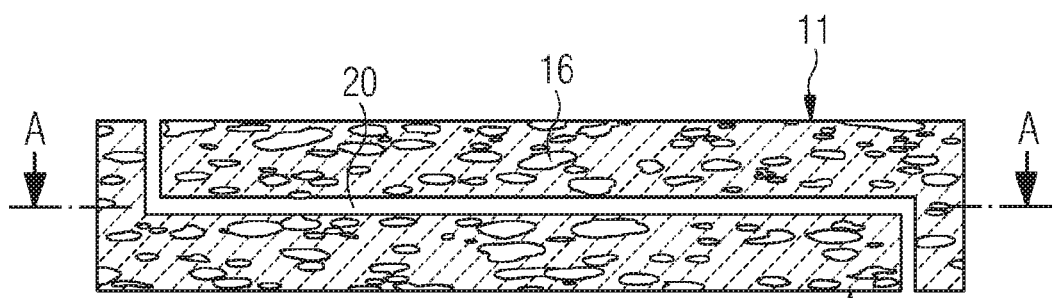
FIGS. 2A and 2B show examples of a material that can be used in a combustor which shows an embodiment of the invention.
Figure 2B:
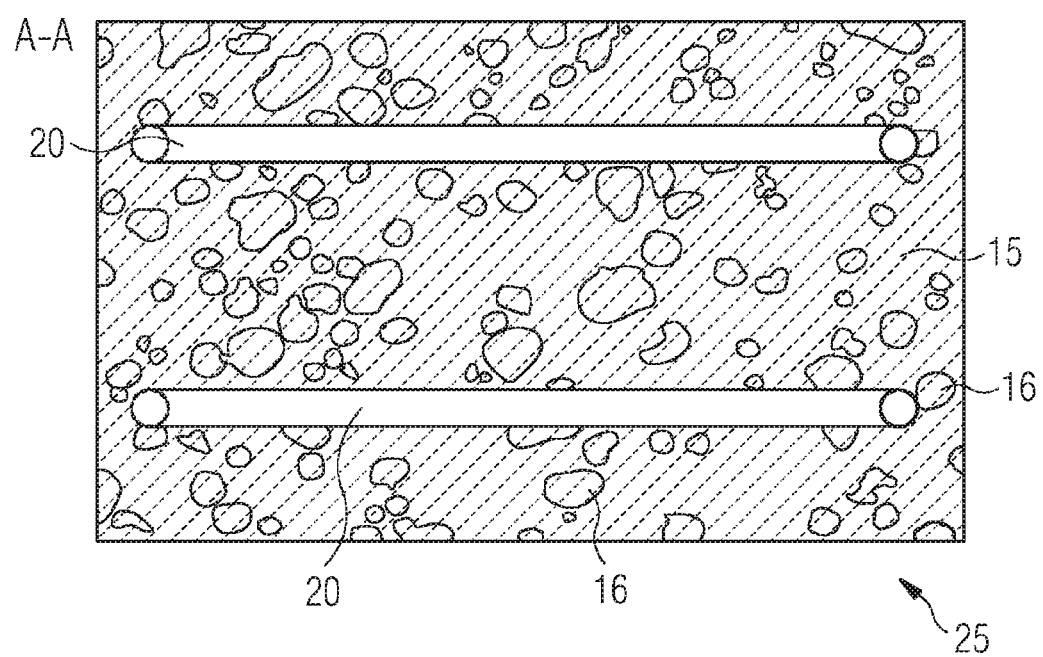

FIGS. 2A and 2B shows two sectional views through the inner wall 2. FIG. 2A shows a section thorough an outer cylindrical surface 11 to an inner cylindrical surface 10 of the outer wall 2 from a similar view as also indicated in FIG. 1. FIG. 2B shows a cut through the plane which is indicated by the line A-A in FIG. 2A. This plane lies completely within the body of the inner wall 2. This depiction is obviously a simplification as a real life component may be curved.

The inner wall 2 comprises a porous material 15. The porous material 15 is used to form substantial parts of the inner wall 2. The porous material 15 comprises a plurality of pores 16. The pores may be of even shape or the plurality of pores 16 may contain at least some pores formed irregularly or non-uniform. Furthermore in FIGS. 2A and 2B a cooling passage 20 is shown which provides a channel for cooling air from the outer cylindrical surface 11 to the inner cylindrical surface 10 (again it has to be noted that the figures show as a simplification a flat surface which in reality would be cylindrical). This passage—which could be an effusion cooling hole or a mixing port—may be implemented as a straight through-hole (not shown in FIGS. 2A and 2B) or may be embodied as a more complex structure, e.g. in S-form like as it is shown in FIGS. 2A and 2B. According to FIGS. 2A and 2B, the cooling passage 2 may have one inlet for cooling air going perpendicular from the outer cylindrical surface 11 in direction of the inner cylindrical surface 10, but then within the layer of the inner wall 2, the cooling passage 2 may expand in a parallel direction to the outer cylindrical surface 11 or parallel to the inner cylindrical surface 10. The outlet then may be directed again in direction to the inner cylindrical wall 10. This passage configuration guides a cooling fluid through and within the inner wall 2 by having it guided through a larger expanse and therefore surface area of the body of the inner wall 2.

The inner wall 2 forms at least in parts a liner 25 of the combustion chamber 1 which therefore forms the inventive part that is built from a porous material 15.

Figure 3:
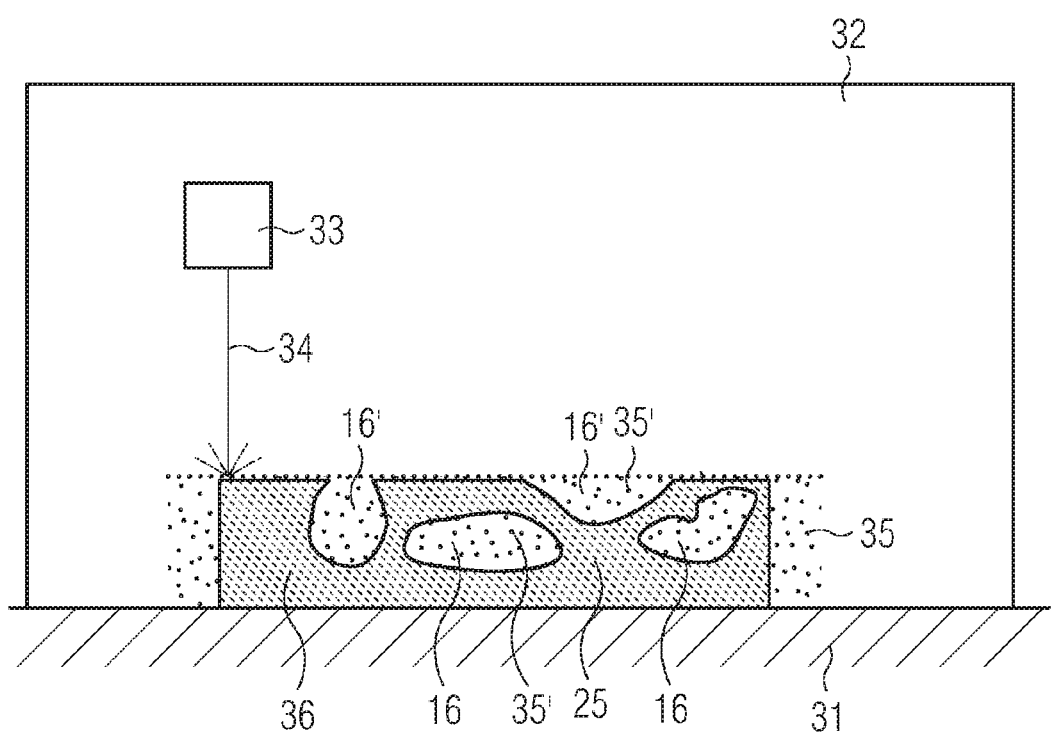
FIG. 3 shows schematically a laser sintering or laser melting chamber in which a component is in the process of being generated layer by layer.

FIG. 3 shows an embodiment in a cross sectional view of a selective laser melting apparatus at a specific operating stage of that apparatus in which a workpiece—which will form the to be built component—that is partly built is shown as being processed in a chamber 32 of the apparatus. In the chamber 32 for laser melting particles 35 will be distributed on a base plate 31 or substrate. The element (called hopper) that distributes the particles is not shown in the figure. A laser 33 is present issuing a laser beam 34 which will be directed onto the surface to be solidified and in direction of the ground plate 31. The laser 33 will be moved or at least the laser beam 34 will be moved or redirected such that a two-dimensional area on the ground plate 31 is covered by the laser beam 34. Alternatively also the ground plate could move and the laser may be fixed. When the laser beam 34 hits a particle 35—typically a plurality of particles—, it will melt this particle 35 which consecutively solidifies such that a solidified area 36 will be generated which eventually will result in the "part" as defined in the patent claims or previously mentioned. At locations where the laser beam 34 is not directed—therefore the particles 35 which are not hit and melted by the laser beam 34—, particles 35 will stay in their state as being loose particles or powder. Layer by layer the particles 35 will be distributed on the ground plate 31 and on the already solidified area 36 such that layer by layer, that part 25 is produced. At the same time the particles 35 are also distributed in regions which are not solidified, e.g. regions of pores which will be realized once the built component is completed.

The path of the laser beam 34 will be controlled such that pores 16 will be generated layer by layer. Within the hollow regions that will eventually become a pore 16, the particles 35 will be inserted as it can be seen in the semi-finished pore 16' in the figure. Different shapes are possible for the pores 16, 16'. The pores eventually will be closed such that they will encapsulate a closed volume in which still loose particles 35 are located. The loose particles 35 within a pore 16 will be considered to form the powder 35'. As said, the powder 35' may remain within the pores 16. Alternatively, the powder can also be removed before a final layer of closing a pore 16 is solidified.

The chamber 32 for laser melting may be filled with a specific gas, for example with a substantial amount of argon or another inert gas. This gas may also be present in the pores 16 during manufacturing of the part 25. Therefore the particles 35 as the powder 35' and the gas may be present together in one enclosed pore 16 or alternatively the powder may be removed from the pore 16 such that, when the pore 16 is closed, only the gas content is encapsulated in the pore 16.

By this procedure, a sponge-like or cellular part can be manufactured. The pores 16 can be shaped and arranged in various manners. Once the component is finished, it may end up as an inner wall 2 as shown in FIG. 1. In that wall, a plurality of pores 16 is therefore included wherein the pores 16 themselves contain the enclosed air and/or powder 35'. This provides a damping effect once the combustion is performed and once a vibration would otherwise occur on the inner wall 2.

The previous embodiment shows that in a laser melting or laser sintering process void local regions which are not heated up by the laser beam 34 will form a plurality of pores 16. The sizes and shapes of the pores 16 and also the distribution of the pores 16 throughout the body of the inner wall 2 can be very flexible or variable particularly non-uniform. A location, the sizes and the shapes of the pores 16 may particularly be selected to modify the Eigen frequencies of the inner wall 2. The frequency of the Eigen frequency may shift. Or the component may be attenuated for all kinds of frequencies, even the natural frequencies of the component. The Eigen frequency will be modified compared to a combustor with a solid inner wall 2 that would establish otherwise during operation. As explained, a pore individually forms a closed cavity without passages to an exterior of the part 25. Therefore, the structure of a pore is particularly gas-tight.

Particularly also other structural elements like the cooling passage 20 as shown in FIGS. 2A and 2B can be incorporated into the part 25 by the laser sintering or laser melting process.

Alternative to the procedure of FIG. 3, the material 15 of the inner wall 2 may be so called metal foam. Metal foam itself may form pores such that the inner wall 2 will be a porous component. During processing of the metal foam a gas or foaming agent may be present that will then be encapsulated into the pores of the foam. To seal the metal foam it may be advantageous to coat the component so that for example the inner wall 2 will have a coating on the inner cylindrical surface 10 and the outer cylindrical surface 11.

The CAD model (CAD: computer aided design) may be very complex to define all pores and all the pores may need to be defined in that model. Therefore the CAD software or the laser sintering or laser melting control software may be improved that simply random pores can be generated by the software itself once in a specific region a porous material is defined in the CAD model. In that model possibly some parameters can be selected like the minimum pore size or the maximum pore size and the percentage of material in a fix state compared to the pore sizes. If gas is only filled into the pores, this may be performed just that the sintering or laser melting process is performed in a gas-tight enclosure like the chamber 32. By this at least a part of the gas that fills the chamber 32 will be included and encapsulated into the pores 16.

The powder 35' that will be identical to the particles 35 may be of such a mechanical nature that possibly after some while powder will consume less space such that the pores 16 will only be partly be filled by the powder 35'. Such a loose powder 35' may be particularly advantageous to perform the wanted damping effect counteracting vibrations.

With such a component modified by the inventive concept it should be possible to design a component which will be able to have less vibration in all modes of operation. That means not only during stable mode of operation but also during transient modes of operation the vibrations will be damped in a sufficient way.

Damping by particles may occur due to that the enclosed but loose particles may collide and/or rub together during operation such that vibration energy is lost.

The porosity or density of a sponge-like material of the part may be possibly different at different sections of the component. Furthermore, the powder and/or the gas which will be included into the pores shall be inert.

Exemplary embodiments of the invention are described above and herein in relation to a combustion chamber liner. Nevertheless, a concept can be applied to a lot of other components that experience vibrations which are unwanted. This can even happen for all kinds of components of a rotating machine. Alternatively the present invention can be applied to all kinds of combustion engines. Furthermore the invention can be applied to components that experience friction which would otherwise result in vibration of at least one component

The invention claimed is:

1. A rotating machine component, comprising
at least one part built from a porous material comprising a plurality of pores,
wherein at least a subset of the plurality of pores is at least partly filled with a powder,
wherein the powder is selected so that the powder will at least in parts convert to a gaseous state when affected by heat during operation of the rotating machine component, and
wherein neither the powder nor a gas formed when the powder converts to the gaseous state can escape the plurality of pores.

2. The rotating machine component according to claim 1, wherein the porous material comprises a laser sintered or laser melted material in which void local regions form the plurality of pores.

3. The rotating machine component according to claim 1, wherein the porous material comprises metal foam.

4. The rotating machine component according to claim 1, wherein sizes and/or shapes of the plurality of pores and/or a distribution of the plurality of pores over the at least one part are selected to modify Eigen frequencies of the rotating machine component.

5. The rotating machine component according to claim 1, wherein the at least one part comprises at least one cooling channel for guiding cooling fluid through the at least one part to cool the at least one part during operation.

6. The rotating machine component according to claim 1, wherein pores of the plurality of pores comprise argon.

7. The rotating machine component according to claim 1, wherein during operation, at least one of the powder and the gas damp vibrations of the at least one part.

8. The rotating machine component according to claim 1, wherein the rotating machine component comprises a gas turbine combustion component.

9. A combustor, comprising
a part, wherein the part is arranged as a rotating machine component according to claim 1.

10. The combustor according to claim 9, wherein the combustor comprises a gas turbine engine.

11. The combustor according to claim 9, wherein the part comprises a combustion chamber liner.

12. A manufacturing method of a part of a rotating machine component, comprising:
building-up of the part as a porous structure by solidifying a base material
  i) from metal foam which forms a plurality of pores or
  ii) via laser sintering or laser melting, wherein the laser sintering or laser melting leaves void local regions to form the plurality of pores; and
providing a powder during building-up of the part such that at least a subset of the plurality of pores is at least partly filled with the powder,
wherein the powder is selected so that the powder will convert to a gaseous state when affected by heat during operation of the rotating machine component, and
wherein neither the powder nor a gas formed when the powder converts to the gaseous state can escape the plurality of pores.

13. The manufacturing method according to claim 12, wherein building-up of the part via laser sintering or laser melting comprises:
generating instructions to a laser positioning control system such that pores of the plurality of pores are generated to comprise random shapes and/or random sizes and/or random distribution.

14. The manufacturing method according to claim 13, wherein the instructions are generated to the laser positioning control system such that the plurality of pores are generated to comprise the random shapes and/or the random sizes and/or the random distribution under evaluation of at least one of the following input parameters as input to the laser positioning control system: a minimum pore size, and a maximum pore size.

15. The manufacturing method according to claim 12, further comprising:
generating instructions to a powder deposition control system such that a building-up powder is provided from a first source for the laser sintering or the laser melting, and the powder is provided from a second source.

16. The manufacturing method according to claim 12, wherein the rotating machine component comprises a gas turbine combustion component.

\* \* \* \* \*